(12) United States Patent
Takahashi et al.

(10) Patent No.: US 7,522,315 B2
(45) Date of Patent: Apr. 21, 2009

(54) IMAGE PROCESSING APPARATUS WITH HIERARCHICAL ENCODER

(75) Inventors: Kenichi Takahashi, Osaka (JP);
Munehiro Nakatani, Amagasaki (JP);
Kaitaku Ozawa, Amagasaki (JP);
Toshiya Shozaki, Neyagawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1146 days.

(21) Appl. No.: 10/720,128

(22) Filed: Nov. 25, 2003

(65) Prior Publication Data
US 2004/0207870 A1    Oct. 21, 2004

(30) Foreign Application Priority Data
Mar. 24, 2003    (JP) .............................. 2003-080091

(51) Int. Cl.
G06K 9/46    (2006.01)
G06T 1/60    (2006.01)
H04N 1/41    (2006.01)
H04N 1/21    (2006.01)
H04N 1/00    (2006.01)

(52) U.S. Cl. .................. 358/426.06; 358/1.2; 358/1.15; 358/426.05; 358/402; 382/240

(58) Field of Classification Search ........................ None
See application file for complete search history.

(56) References Cited

U.S. PATENT DOCUMENTS

| 4,261,018 | A | * | 4/1981 | Knowlton .................... 358/470 |
| 5,412,486 | A | * | 5/1995 | Bannai et al. ............... 358/444 |
| 5,781,175 | A | * | 7/1998 | Hara .......................... 345/670 |
| 6,864,997 | B2 | * | 3/2005 | Kondo et al. ........... 358/426.02 |
| 7,373,000 | B2 | * | 5/2008 | Ozawa et al. ................ 382/232 |
| 2004/0218210 | A1 | * | 11/2004 | Shozaki et al. ............. 358/1.15 |

FOREIGN PATENT DOCUMENTS

JP    6-152979         5/1994
JP    2004289580 A  * 10/2004

* cited by examiner

*Primary Examiner*—Twyler L Haskins
*Assistant Examiner*—Myles D Robinson
(74) *Attorney, Agent, or Firm*—Buchanan Ingersoll & Rooney PC (57) ABSTRACT

When image data are sent through a network, bit streams of hierarchically encoded JPEG 2000 data of a plurality of pages of a document are formed by prioritizing resolution, and the bit streams of the plurality of pages are divided in a plurality of files based on the unit of hierarchical encoding such as resolution or layer level. Then, the plurality of files of all the pages are arranged into a plurality of combinations thereof based on resolution or layer level. Then, an electronic mail is written and sent to the same destination for each of the combinations by attaching all the files included therein.

9 Claims, 13 Drawing Sheets

| LL | 1HL |
|---|---|
| 1LH | 1HH |

*Fig.4B*

| LL | 2HL | 1HL |
|---|---|---|
| 2LH | 2HH | |
| 1HL | | 1HH |

*Fig.4C*

| LL | 3HL | 2HL | 1HL |
|---|---|---|---|
| 3LH | 3HH | | |
| 2LH | | 2HH | |
| 1LH | | | 1HH |

| PAGE 1 | PAGE 1 HEADER | PAGE 1 LL | PAGE 1 3HL | PAGE 1 3LH | PAGE 1 3HH | PAGE 1 2HL | PAGE 1 2LH | PAGE 1 2HH | PAGE 1 1HL | PAGE 1 1LH | PAGE 1 1HH |
|---|---|---|---|---|---|---|---|---|---|---|---|
| PAGE 2 | PAGE 2 HEADER | PAGE 2 LL | PAGE 2 3HL | PAGE 2 3LH | PAGE 2 3HH | PAGE 2 2HL | PAGE 2 2LH | PAGE 2 2HH | PAGE 2 1HL | PAGE 2 1LH | PAGE 2 1HH |
| PAGE 3 | PAGE 3 HEADER | PAGE 3 LL | PAGE 3 3HL | PAGE 3 3LH | PAGE 3 3HH | PAGE 3 2HL | PAGE 3 2LH | PAGE 3 2HH | PAGE 3 1HL | PAGE 3 1LH | PAGE 3 1HH |
| PAGE n | PAGE n HEADER | PAGE n LL | PAGE n 3HL | PAGE n 3LH | PAGE n 3HH | PAGE n 2HL | PAGE n 2LH | PAGE n 2HH | PAGE n 1HL | PAGE n 1LH | PAGE n 1HH |

IMAGE PROCESSING APPARATUS WITH HIERARCHICAL ENCODER

This application is based on application No. 2003-80091 filed in Japan, the contents of which are hereby incorporated by reference.

BACKGROUND OF THE INVENTION

1. Field of the Invention

The present invention relates to transmission of code data of images.

2. Description of Prior Art

Communication of image data uses a public line network previously, but as the Internet becomes popular, image data are also sent through the Internet. By using the Internet, communication cost is decreased and communication time becomes shorter.

There are various communication protocols for the Internet, such as HyperText Transfer Protocol (HTTP) for browsing a home page, File Transfer Protocol (FTP) for file transfer and Simple Mail Transfer Protocol (SMTP) for electronic mail (hereinafter referred to as e-mail).

In order to prevent web hacking to an internal system of users, a firewall is provided generally at a connection between the Internet and a network such as a local area network. The firewall has a function to control communication protocols which pass between the Internet and a user in the network, and it limits protocols which pass the firewall. Usually, protocols for e-mail are allowed to pass the firewall. Therefore, when an image data is sent through the Internet, an e-mail delivery system is used.

However, when an e-mail with attachment of image data is sent through the Internet, it is a problem that the mail size is limited. As the number of the functions equipped for a recent image forming apparatus such as a printer or a multi-functional peripheral is increased and the quality thereof become higher, the size of images obtained by the image forming apparatus is increased to about ten megabytes, and it would be increased further in the future. On the other hand, a mail server which collects and delivers e-mails generally limits the size of e-mail that can be transmitted. The size limit is for example one megabyte. Therefore, when the size of an image file exceeds the size limit, an e-mail attached with the image file would be refused to be received.

When the size of image data is large, if the image data is divided into a plurality of data having a size smaller than the limit, it can be sent through the mail server to a user. Then, a large file is divided into a plurality of small files, and each of the small files is attached to an e-mail. At the user's terminal, the attachment of the divided files is received, and the original file is recovered from the files. However, in this e-mail transmission of divided files, only a part of the entire image data is included in each divided file attached to an e-mail. Therefore, the contents of the entire image cannot be gotten by a user until all the e-mails are received.

In a facsimile apparatus disclosed in Japanese Patent laid open Publication 6-152979/1997, progressive code data of image data are obtained by reducing the image data successively and by encoding them hierarchically, and the code data are sent with facsimile transmission. The image data are encoded for each resolution, and the encoded data for each resolution are transmitted. At the second transmission and thereafter, difference data from the data of the resolution already received is transmitted. In this method, it is not necessary to divide the image data because a public line network has no limitation on file size. However, the transmission takes a long time. Further, when an image consisting of a plurality of pages are received, the data is received page by page. Therefore, a user cannot understand a general outline of the entire contents at an early stage.

SUMMARY OF THE INVENTION

An object of the invention is to make it possible to get a summary of a transmitted document consisting of a plurality of pages at an early stage.

In an image processing method according to the invention, bit streams of hierarchically encoded JPEG 2000 data of a plurality of pages of a document are formed by prioritizing resolution, and the bit streams of the plurality of pages are divided in a plurality of files based on the unit of hierarchical encoding such as resolution or layer level. Then, the plurality of files of all the pages are arranged into a plurality of combinations thereof based on resolution or layer level. Then, an electronic mail is written for each of the combinations by attaching all the files included in the each of the combinations, and the electronic mails are sent to the same destination.

An advantage of the present invention is that a general view of the images can be understood at an early stage when JPEG 2000 files of a plurality of pages are sent as an e-mail with attached files.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
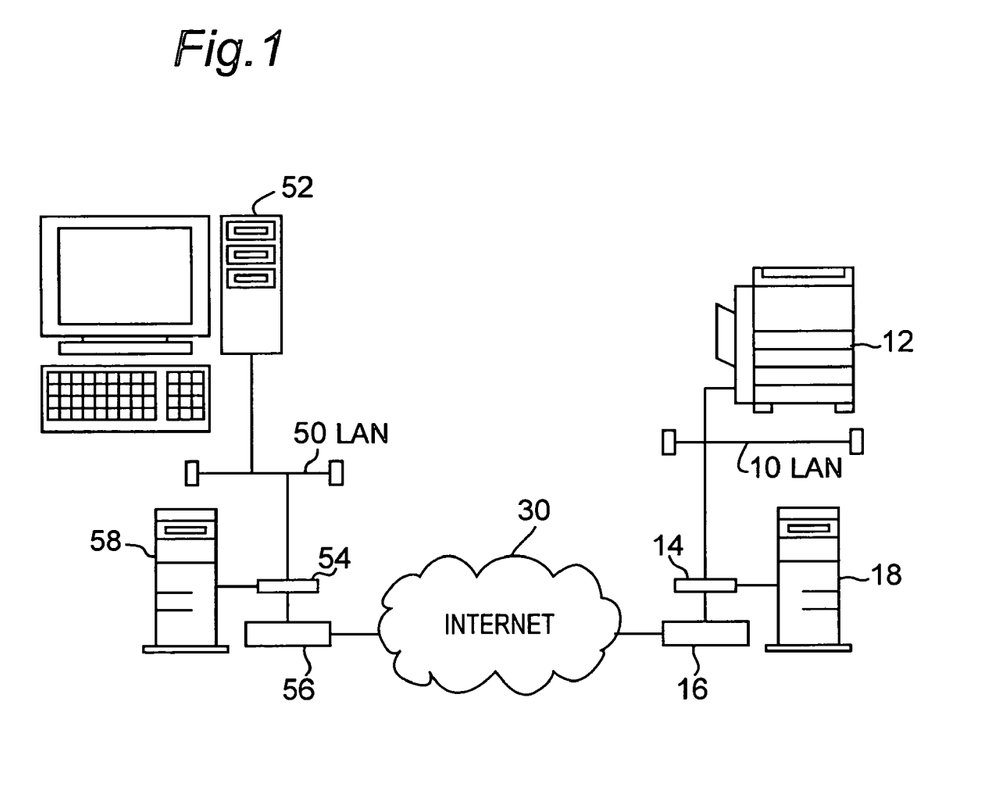
FIG. 1 is a diagram of a network including a multi-functional peripherals and computers.

Referring now to the drawings, wherein like reference characters designate like or corresponding parts throughout the several views, FIG. 1 shows a system where image data are transmitted. This system has a network (local area network) 10 including an image processing apparatus such as a multi-functional peripheral 12 which sends an image file, another network (local area network) 50 including a computer (client terminal) 52 which receives the image data, and the Internet 30 connecting them. In this system, a plurality of the network 50 can be connected to the network 10, but for the brevity of explanation, only one local area network 50 is shown in the example in FIG. 1.

As mentioned above, the multi-functional peripheral 12 (hereinafter referred to as MFP) is connected to the LAN 10. The MFP 12 can be connected though the LAN 10, a firewall 14 and a router 16. Further, a mail server 18 is connected to the LAN 10 for collecting and delivering e-mails.

The other LAN 50 includes the computer (personal computer) 52 which receives an image file sent from the MFP 12. The computer 52 can be connected to the LAN 50, a firewall 54 and a rooter 56 to communicate with the MFP 12. Further, a mail server 58 is connected to the LAN 50 for collecting and delivering e-mails. Though not shown, mail servers also exist in the Internet between the two rooters 56 and 16, and e-mails are transmitted through mail servers.

The MFP 12 has a JPEG codec (coder-decoder) which converts image data of a document of a plurality of pages read by a scanner to a JPEG 200 file and stores it in a storage device. If instructed, the JPEG 2000 files attached to an e-mail to an e-mail address of a user are sent to a mail server. The user at the computer 52 receives an e-mail addressed to him or her from the mail server 58. The transmission of an image file is explained here. An image file is attached to an e-mail at the MFP 12, and the e-mail to the e-mail address of the user is sent to the mail server 58. The e-mail with the attached image file is sent through the LAN 10, the mail server 18, the Internet 30, the LAN 50 to a mail box in the mail server 58. The user at the computer 52 downloads the e-mail from the mail server 58.

The mail server 58 limits a receivable size of an e-mail to 1 M bytes. Therefore, for a JPEG 2000 file of a size exceeding a predetermined threshold value is divided into files of sizes smaller than the threshold value, and each divided file is attached to an e-mail. That is, one image data is divided and sent with a plurality of e-mails. The computer 52 has a tool program for restoring the original JPEG 200 file to reproduce the image from the JPEG 2000 files attached to the e-mails.

Figure 2:
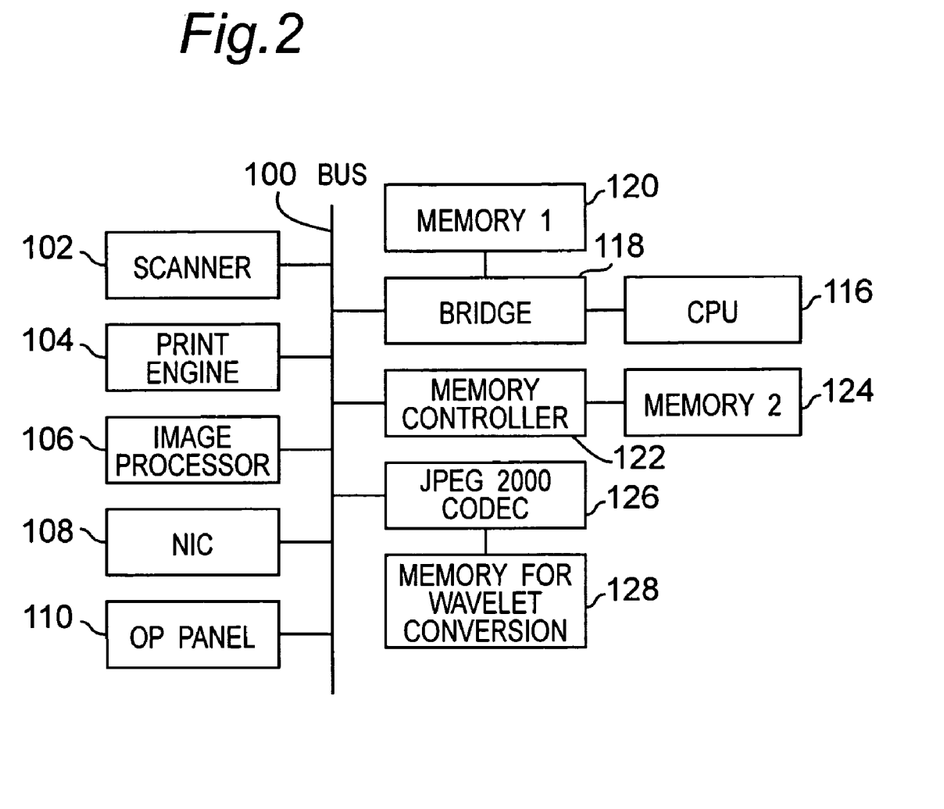
FIG. 2 is a block diagram of a multi-functional peripheral.

FIG. 2 is a block diagram of the MFP 12. Each block is connected via a bus 100 such as PCI bus. The MFP 12 has a scanner 102 for reading a document, a print engine 104 for printing, an image processor 106 for image data, and an operational panel 110 for the operation by a user. The operational panel 110 includes a display panel. Further, the MFP 12 has a communication device (network interface card (NIC)) 108 for communication through the LAN 10.

A central processing unit 116 (hereinafter referred to as CPU) is connected through a bridge 118 to a first memory device 120 and devices connected to a bus 100 such as PCI bus. Image data or JPEG 2000 data received through the communication device 108 or the like is transferred with direct memory access (DMA) to a second memory device 124 connected to a memory controller 122, and the image data stored in the second memory 124 is transferred with DMA to a JPEG 2000 codec 126. The JPEG 2000 codec 126 encodes the image data to JPEG 2000 data with use of the memory device 128 for wavelet conversion or decodes JPEG 2000 data to image data. The image data obtained by decoding is stored in the first memory device 120, and the file stored in the first memory 120 is sent via DMA to the second memory 124 and stored therein.

Next, an operation of MFP 12 to send a JPEG 2000 file to an external computer 52 is explained. A JPEG 2000 file stored in the second memory 124 is transferred with DMA through the memory controller 122 to the first memory 120. The image data stored in the memory device 120 is subjected to replacement of code data (compressed data) or reconstruction thereof by the CPU 116. Then, the image data are sent by the communication device 108 to the network. Data transmission to the computer 52 is performed through mail servers.

Figure 3:
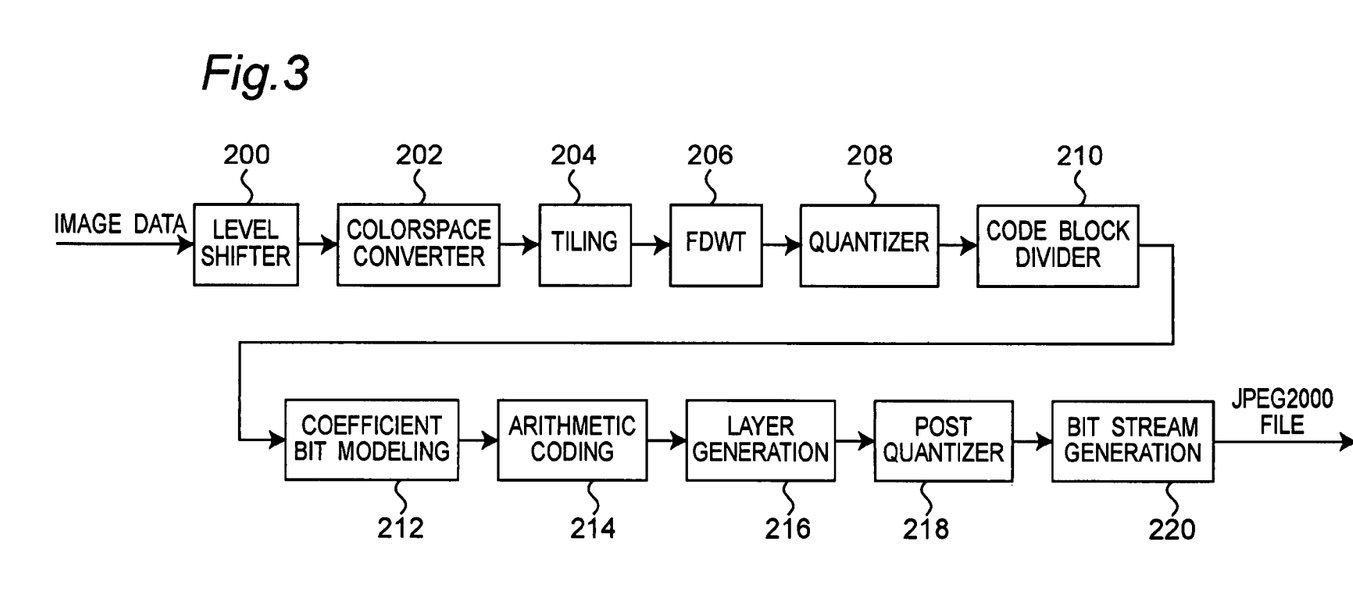
FIG. 3 is a diagram of JPEG 2000 encoding in JPEG 2000 codec.

FIG. 3 shows a flow of JPEG 2000 encoding in the JPEG 2000 codec 126. This encoding (compression) is similar to the conventional encoding of JPEG 2000. A level shifter 200 decreases each color component of image data received in the JPEG 200 codec 126 to a half of its dynamic range (level shift). No level shift is performed if the input data has a sign such as color difference components of YCrCb data. Next, a color space converter 202 converts the color space of image data, and a tiling processor 204 divides the image data subjected to the color space conversion into blocks of a predetermined size. Next, an FDWT processor 206 performs discrete wavelet conversion for each tile to divide the image into a plurality of band regions. A quantizer 208 performs quantization on the image subjected to the wavelet conversion, if necessary. A code block divider 210 divides the data subjected to the wavelet conversion for each tile into code blocks, and a coefficient bit modeling device 212 generates code paths with bit modeling. The generated code path is subjected to arithmetic encoding by an arithmetic encoder 214. A layer generator 216 divides the generated code data (compressed data) into a plurality of layers according to the degree of contribution to image quality. A post quantization processor 218 rounds data exceeding a predetermined amount of codes. Finally, a bit stream generator 220 generates a bit stream of the data and outputs a JPEG 2000 file thereof. The decoding at the apparatus which receives the JPEG 2000 file is performed in the reverse direction.

In the MFP (image processing apparatus) 12 having the JPEG 200 codec 126, when image data of a document consisting of a plurality of pages read by a scanner is compressed, hierarchical encoding is used. The bit stream data is divided into files by giving priority to hierarchical encoding unit such as resolution or layer. When JPEG 2000 code data of a plurality of pages are divided and transmitted as attachment to e-mails, the unit of a combination of the pages is the unit of hierarchical encoding such as resolution or layer. First files including data such as low resolution data which show the entire files generally but with low image quality, are attached to the first e-mail, and the remaining data files are sent with following e-mails. Thus, when the computer as the destination of the e-mails receives the first e-mail, it can observe a general view on the plurality of pages based on the first files.

Figure 4A:
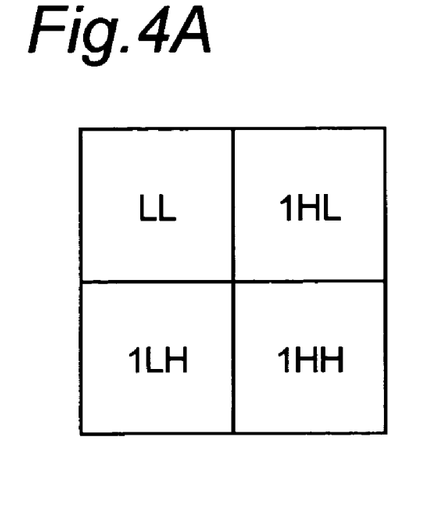
FIGS. 4A, 4B and 4C are diagrams for explaining data obtained by thrice wavelet conversion.
Figure 4B:
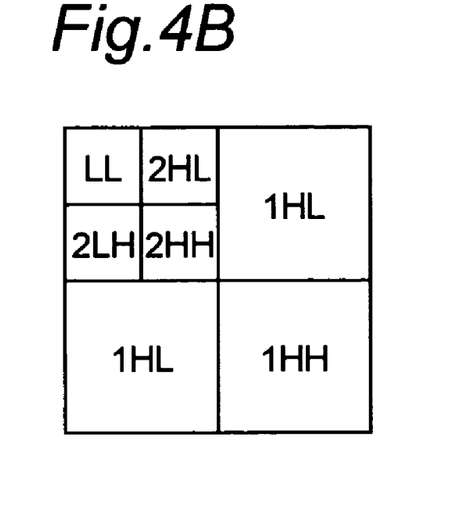
Figure 4C:
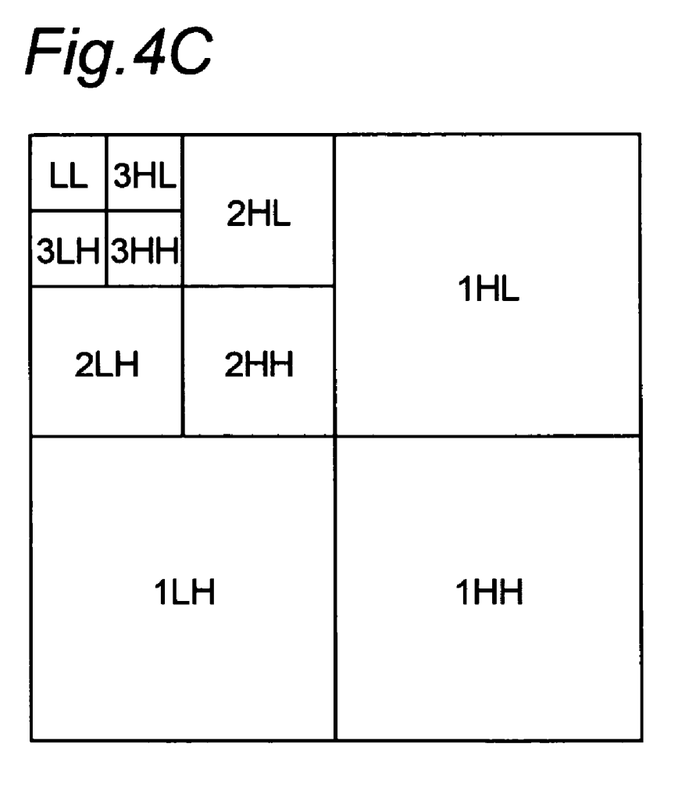

Next, generation of bit stream data is explained when priority is given to resolution in progressive encoding. FIG. 4 shows code data schematically when an image of a tile is subjected to wavelet conversion thrice. An image of a half size of the original image is obtained by one wavelet conversion. As shown in FIG. 4A, the entire image data is converted to four code data of 1HL, 1LH, 1HH and LL, where LL denotes code data of a resolution of a half of the original image. In the second wavelet conversion, as shown in FIG. 4B, the code data LL is converted to four code data of 2HL, 2LH, 2HH and LL. In the third wavelet conversion, as shown in FIG. 4C, code data LL is converted to four code data of 3HL, 3LH, 3HH and LL.

Figure 5:
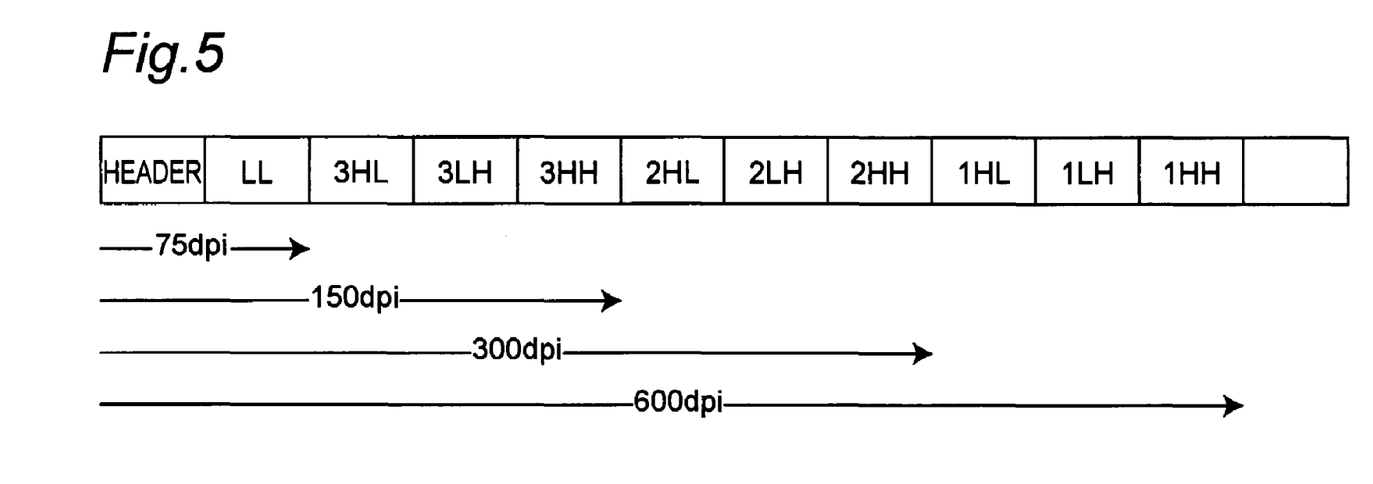
FIG. 5 is a diagram of arrangement of code data by prioritizing resolution.
Figure 6:
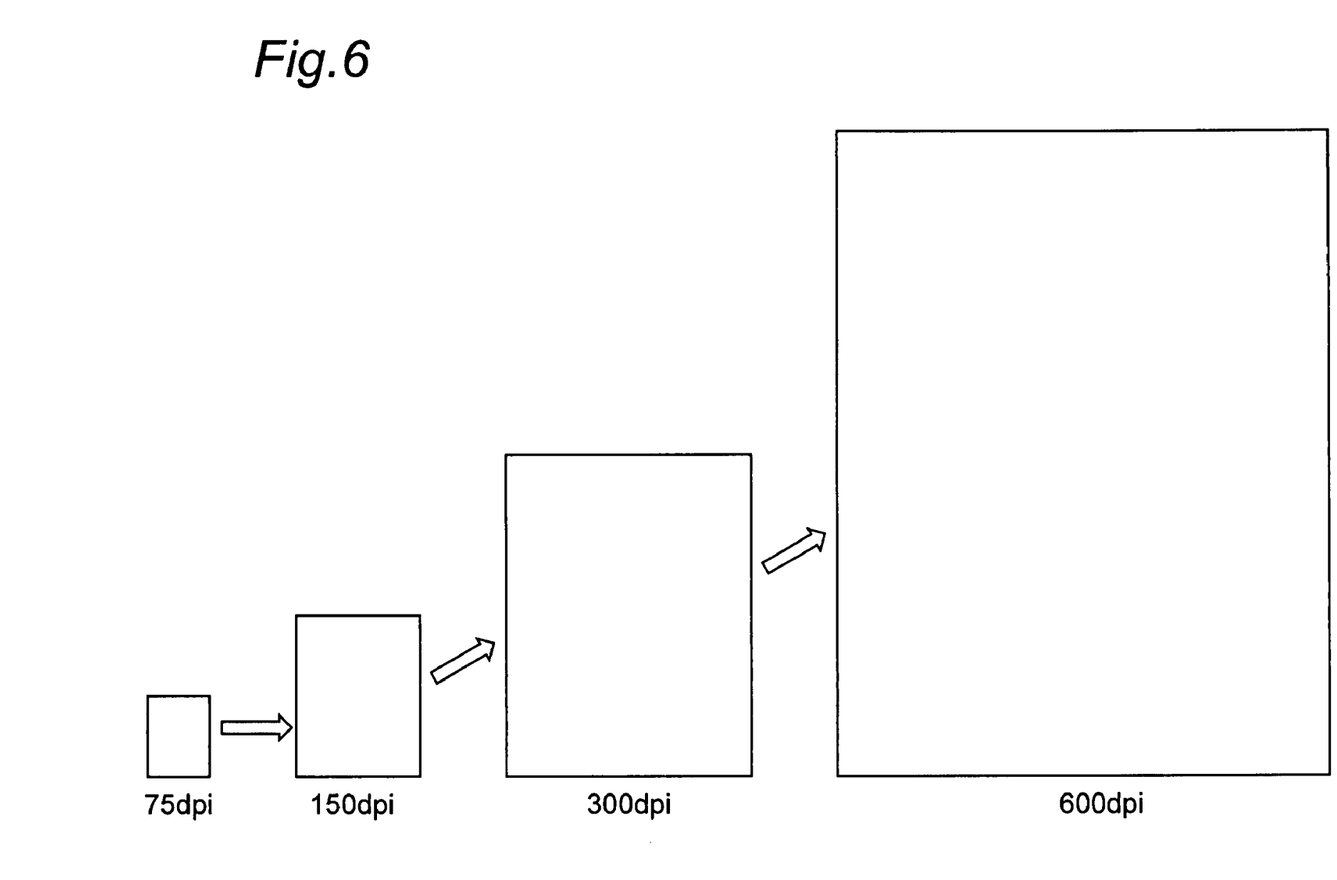
FIG. 6 is a diagram for showing a change in image size according to resolution level.

As shown in FIG. 5, if the resolution of the original image is 600 dots per inch (dpi), images of 300, 150 and 75 dpi are extracted by the above-mentioned thrice wavelet conversions. By arranging the code data in the order of LL, 3HL, 3LH, 3HH, 2HL, 2LH, 2HH, 1HL, 1LH and 1HH, an image can be displayed while increasing the resolution level successively from 75 to 150, 150 to 300, and 300 to 600 dpi. If an image of 75 dpi is desired, code data of LL is used. If an image of 150 dpi is desired, code data of LL, 3HL, 3LH and 3HH are used. If an image of 300 dpi is desired, code data of LL, 3HL, 3LH, 3HH, 2HL, 2LH and 2HH are used. If an image of 600 dpi is desired, all the code data are used. As shown in FIG. 6, the vertical and horizontal sizes of an image are increased twice according as the resolution level is increased.

Figure 7:
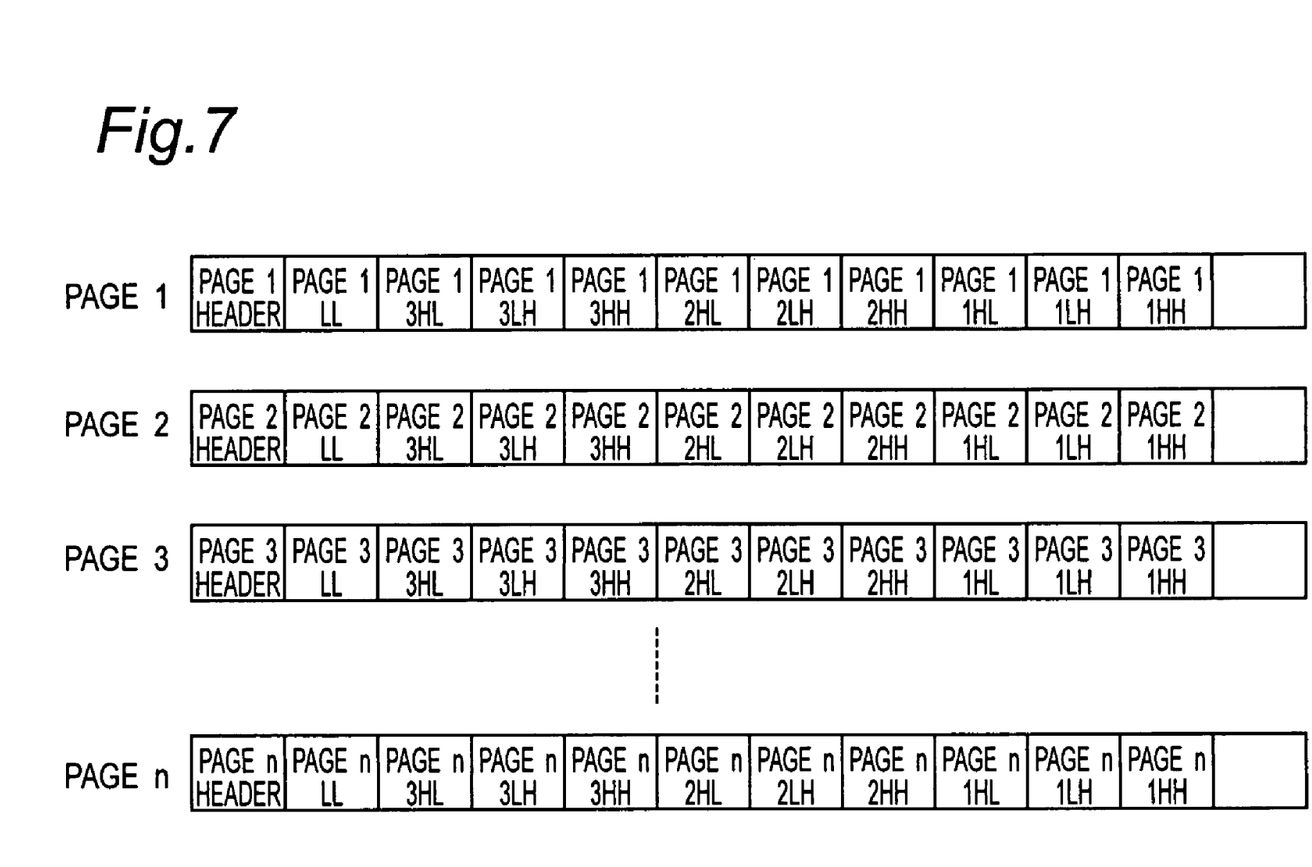
FIG. 7 is a diagram of an internal structure of JPEG 200 file of each page.

Then, as shown in FIG. 7, bit streams of data of JPEG 2000 files generated by the MFP 12 on the plurality of pages of a document are generated by arranging the code data of each page in the order of header, LL, 3HL, 3LH, 3HH, 2HL, 2LH, 2HH, 1HL, 1LH and 1HH. Thus, data of a document of n pages become n files of code data, and each file has a bit stream structure wherein resolution level is prioritized.

Figure 8:
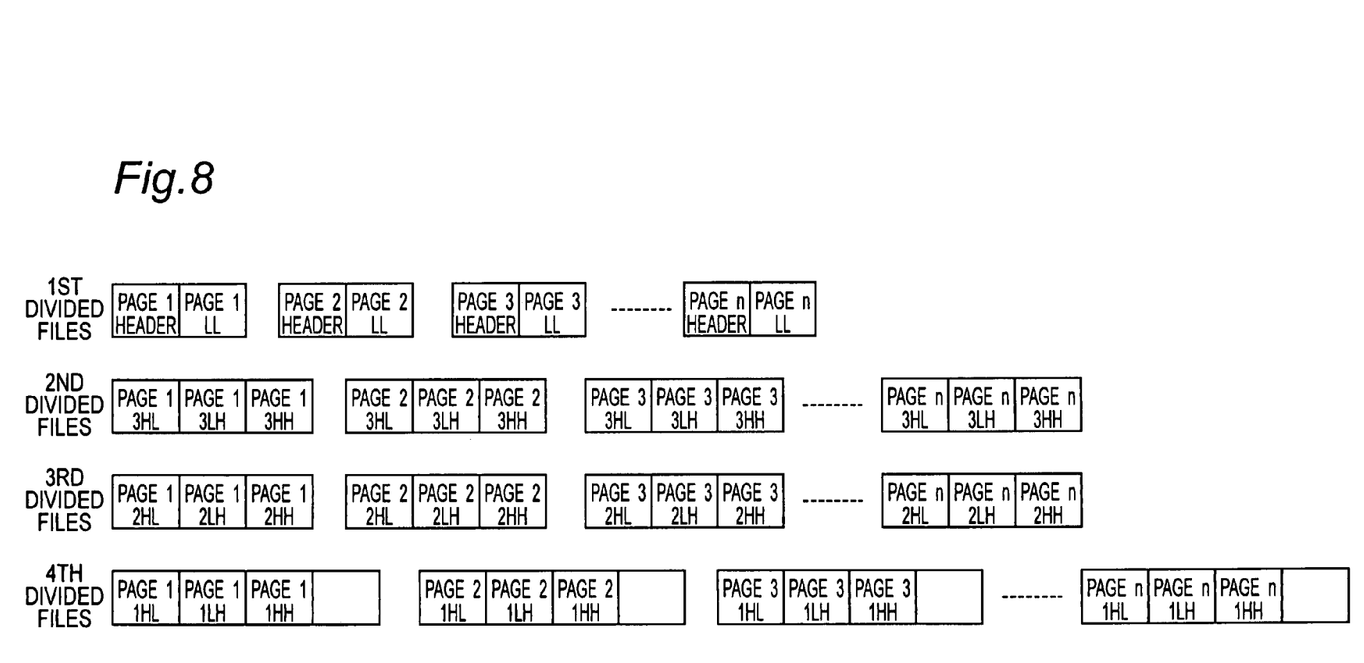
FIG. 8 is a diagram of an example of file division.

When these files are attached to e-mails, as shown in FIG. 8, the files are divided to four combinations in the unit of hierarchical encoding. That is, the bit stream data are divided to four combinations of files of the resolution levels of 75, 150, 300 and 600 dpi. Then, each combination of files of bit stream data of the same resolution level is attached to an e-mail, and the four e-mails are sent to the same destination.

As the first combination of the divided files, bit stream data of header and LL of each page or those of the lowest resolution levels are extracted (refer to the top line in FIG. 8), and the files are attached to a first e-mail. At the computer 52, a user can observe an image after decoding the files of low resolution of each page when the first combination is received. Then, the user can catch a summary of the entire document though the resolution of the decoded images is low.

Next, as the second combination of the divided files, files of bit stream data of 3HL, 3LH and 3HH (or those of the next higher resolution level) of each page are attached to a next e-mail, and the e-mail is sent to the same destination. Further, as the third combination of the divided files, files of bit stream data of 2HL, 2LH and 2HH (or those of the next higher resolution level) of each page are attached to a third e-mail, and the e-mail is sent to the same destination. Finally, as the fourth combination of the divided files, files of bit stream data of 1HL, 1LH, 1HH and marker (or those of the highest resolution level) of each page are attached to a fourth e-mail, and the e-mail is sent to the same destination.

At the receive side, the second to fourth combinations of the divided files are assigned successively to the data of each page decoded from the first divided files. Thus, data of higher resolutions of each page can be recovered.

In the above-mentioned example, data of the same resolution level is assigned to each divided file. However, data of a plurality of resolution levels may be assigned to a combination of the divided files.

When the files are divided and combined as shown in FIG. 8, images of n pages reproduced with the first combination of the divided files have a resolution of 75 dpi if that of the original image is 600 dpi. However, the image of 75 dpi may not be readable, or it may not be understood what is the image. Then, preferably, the level of resolution used for displaying an image of lowest image quality can be set by a user. Alternatively, the level of resolution is set beforehand. Thus, the resolution of the images obtained with the first combination of the divided files can be increased.

Figure 9:
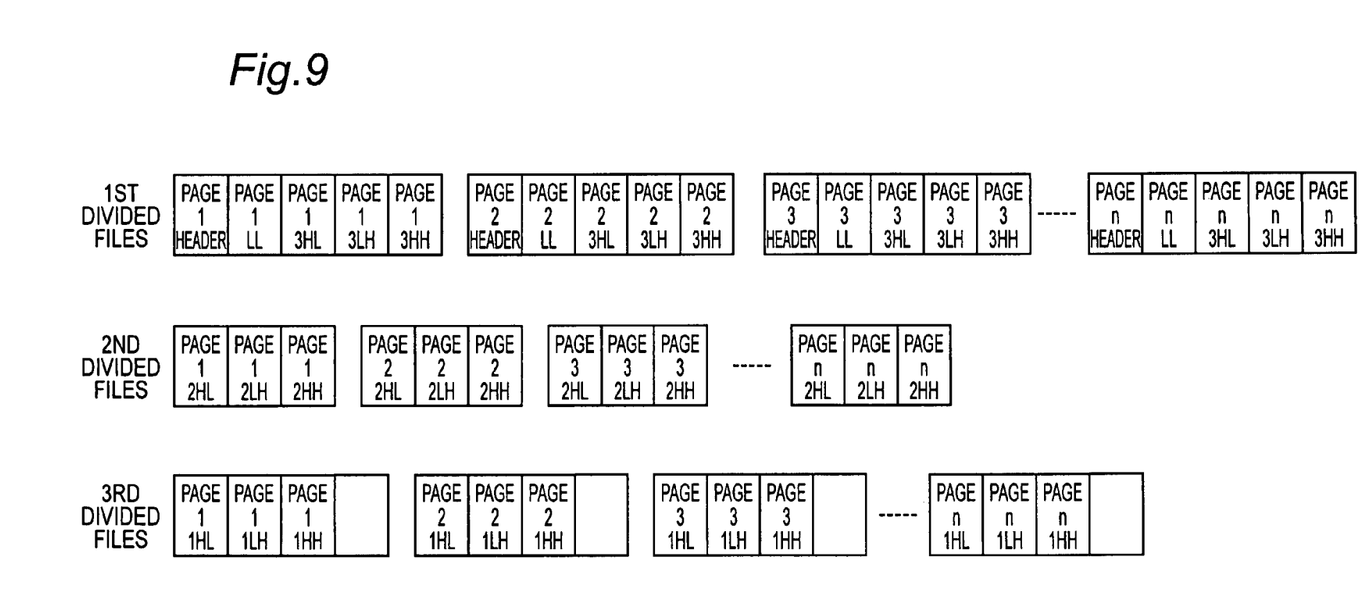
FIG. 9 is a diagram of another example of file division.

FIG. 9 shows an example of this type of file grouping. In this example, resolution of display of the first combination of the divided files is set to 150 dpi. Therefore, as the first combination, files of bit stream data of header, LL, 3HL, 3LH and 3HH of each page (or bit stream data of the resolution level of 150 dpi) are transmitted. Because the code data of LL, 3HL, 3LH and 3HH are assigned to the first combination of divided files, the computer at the receive side can display images of 150 dpi when the first combination of divided files are received.

Next, as the second groups of divided files, files of extracted bit stream data of header, 2HL, 2LH and 2HH of each page (or bit stream data of the next resolution level 300 dpi) are transmitted. As the third groups of divided files, files of extracted bit stream data of 1HL, 1LH and 1HH of each page (or bit stream data of the highest resolution level 600 dpi) are transmitted.

At the receive side, in order to make data of lower resolution to data of higher resolution, similarly to the example shown in FIG. 8, the second and third combinations of the divided files are assigned to the data of each page decoded from the first divided files. Thus, data of higher resolutions of each page can be recovered.

Next, generation of bit stream data is explained when priority is given to layer level in progressive encoding. Layer is used when scalability on image quality is dealt with. In a process for giving scalability to image quality, in the encoding in the JPEG 2000 codec 126, code data are divided into layers according to the degree of contribution to image quality, and bit streams are formed in the order of layer level. In this case, the size of an image is not changed, but the image quality is improved gradually according as the layer level is increased.

Figure 10:
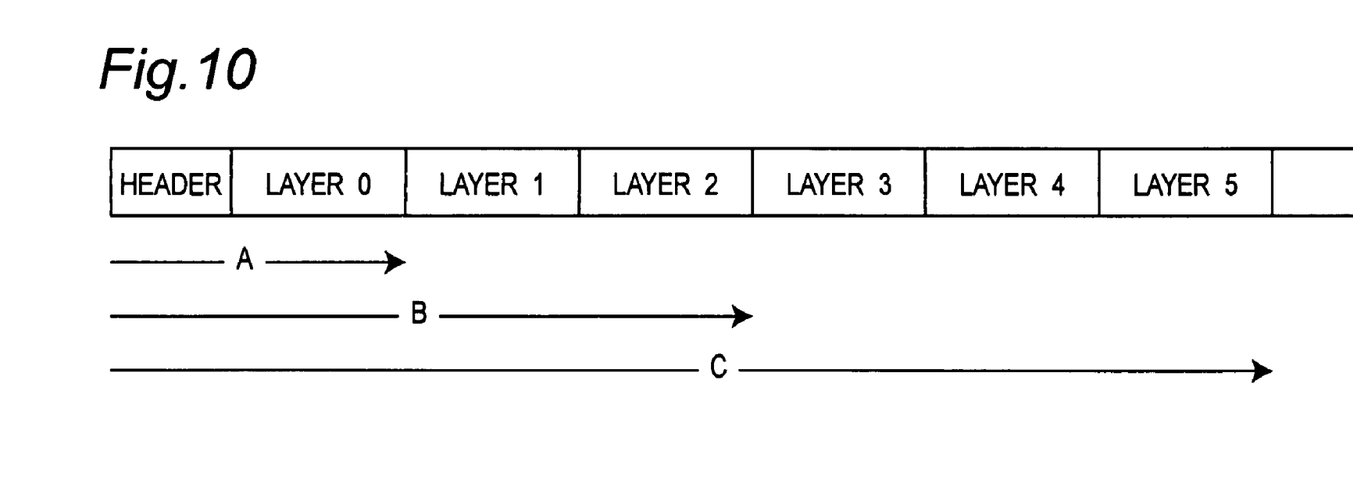
FIG. 10 is a diagram of arrangement of code data by prioritizing layer level.
Figure 11:
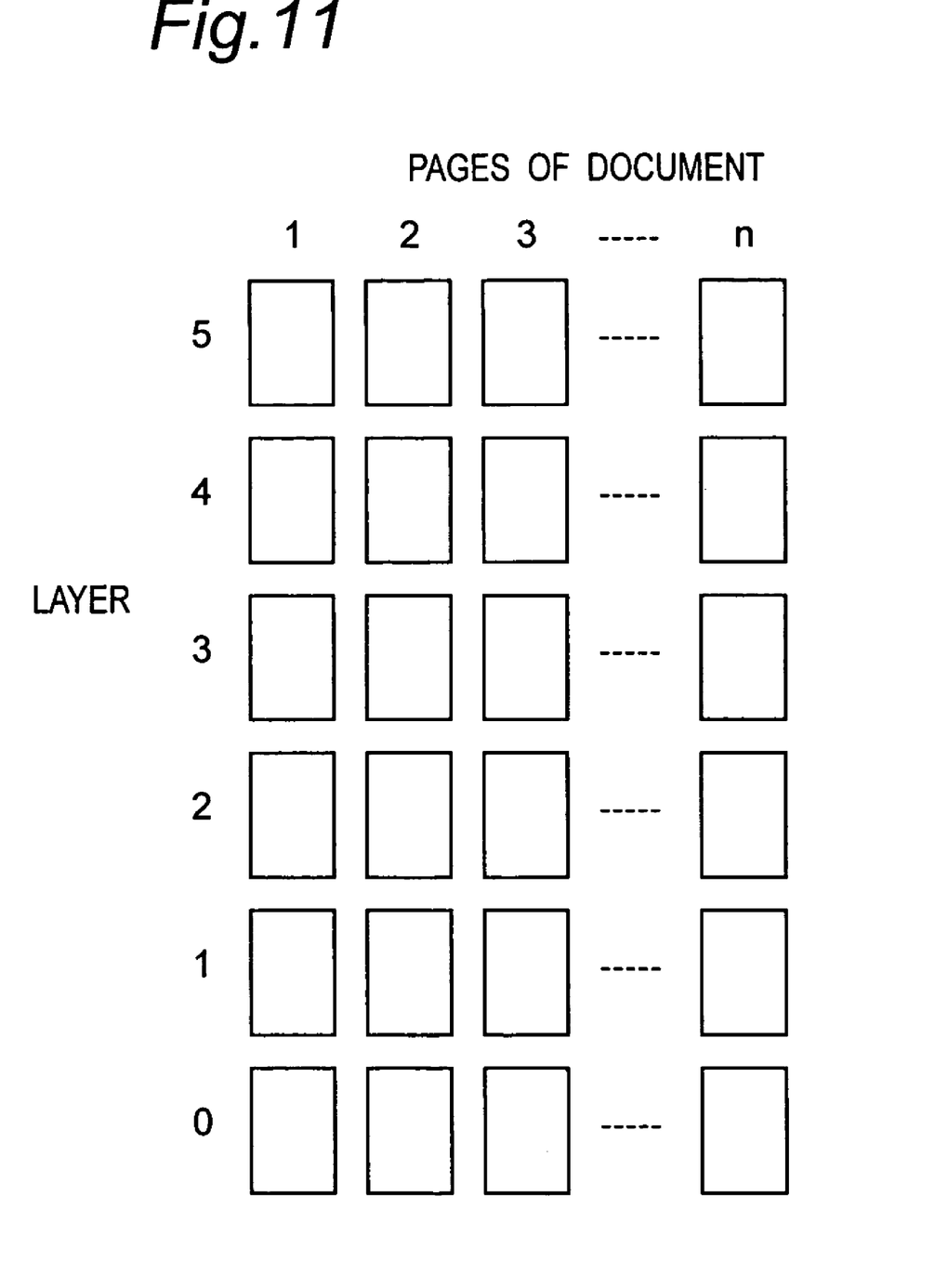
FIG. 11 is a diagram of file division according to layer levels.

FIG. 10 shows a file structure when image quality has scalability, and FIG. 11 shows file division of bit stream data for each page of document. By binding data of layer 0 to layer 5 successively, the image quality is improved gradually.

When image files are transmitted with an e-mail, the files are divided in the unit of layer level. Layer 0 contributes to the image quality in the largest degree, while layer 5 contributes to the image quality in the smallest degree. When the divided files in a combination are attached to an e-mail, data of a plurality of divided layers are attached to an e-mail for each layer level of layer 0, layer 1, layer 2, . . . , layer 5.

As shown in FIG. 11, an e-mail is sent first with a first combination of divided files obtained by extracting bit stream data of the header and data of layer level 0 of each page. A user at the terminal which receives the e-mail can observe decoded images of a plurality of pages of a document when the first group of the divided files are received. That is, though the image quality is low, the user at the terminal can understand the whole document generally, without receiving the remaining divided files.

Next, an e-mail is sent with a second combination of the divided files obtained by extracting bit stream data of layer level 1 of each page. Next, an e-mail is sent with a third group of the divided files obtained by extracting bit stream data of layer level 2 of each page. Next, an e-mail is sent with a fourth group of divided files obtained by extracting bit stream data of layer level 3 of each page. Next, an e-mail is sent with a fifth group of the divided files obtained by extracting bit stream data of layer level 4 of each page. Finally, an e-mail is sent with a sixth group of divided files obtained by extracting bit stream data of layer level 5 of each page.

An image recovered with the first combination of the divided files of layer level 0 may not have sufficient information to understand the whole document. Then, similarly to the first embodiment on resolution, it may be preferable for a user to designate the layer level for the first group of divided files.

Figure 12:
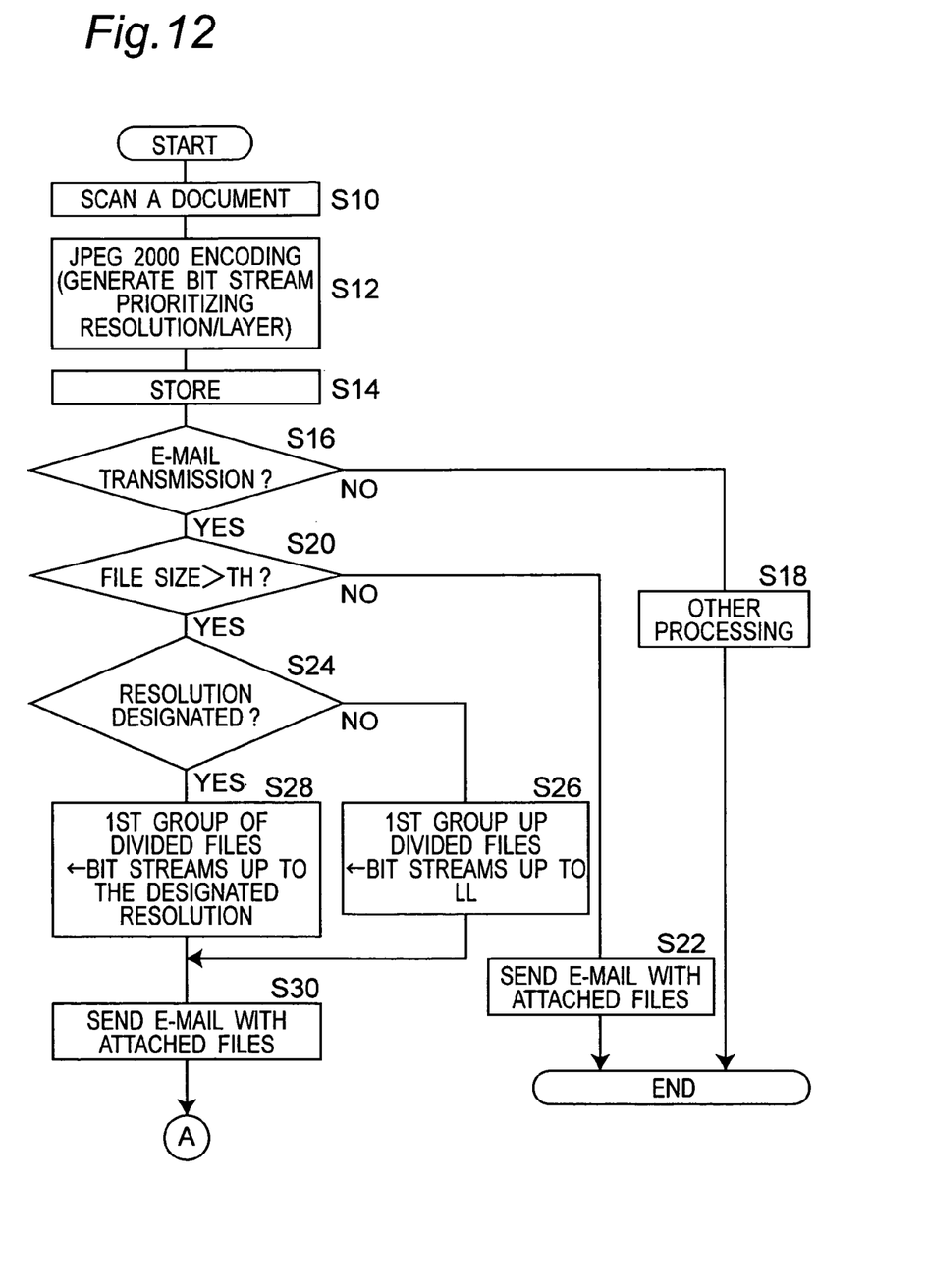
FIG. 12 is a part of a flowchart of e-mail transmission.
Figure 13:
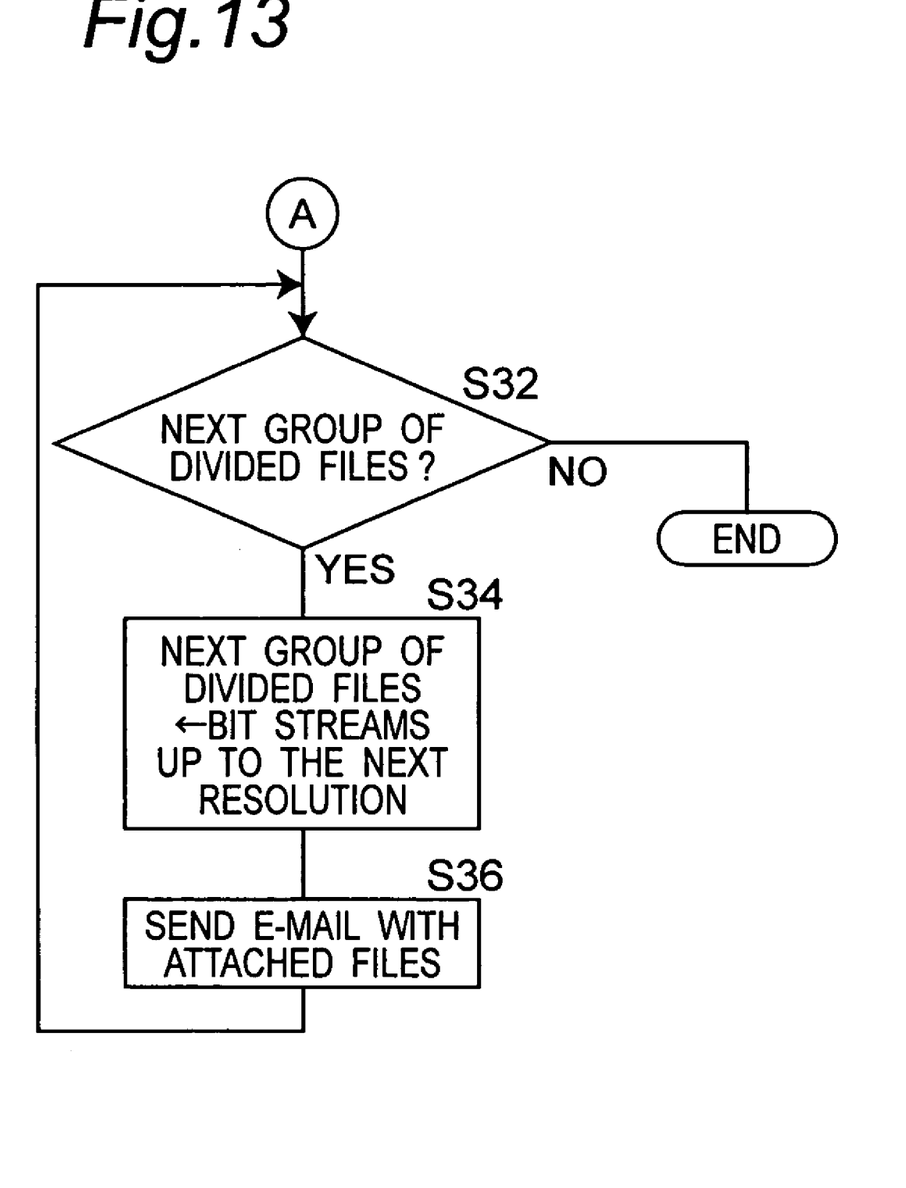
FIG. 13 is the other part of the flowchart of e-mail transmission.

FIGS. 12 and 13 show a flowchart of e-mail transmission of the CPU 116 in the MFP 12. This is executed by the CPU 116 according to the image processing program stored in the first memory. First, image data are read by the scanner by scanning a plurality of pages of a document (S10), and bit streams are generated by the JPEG 200 codec 122 by prioritizing the resolution (S12). The JPEG 2000 code data are stored in the memory device 124 (S14). If mail transmission is not instructed (NO at step S16), other processings are performed (S18).

If mail transmission is instructed (YES at S16), it is decided next whether the size of the data files of images read by the scanner is larger than the threshold value TH or not (S20). If it is smaller than TH (NO at S20), the data files are attached to an e-mail, and the e-mail is sent (S22). The above-mentioned e-mail transmission is instructed by a user with the operational panel 110, and a destination address of the e-mail is also given at the same time.

If the file size is larger than the threshold TH (YES at S20), it is checked next whether resolution for a first combination of divided files is designated or not (S24). If the resolution is not designated (NO at S24), the first combination of the divided files are made based on the bit streams up to code data LL (S26). On the other hand, if the resolution is designated (YES at S24), the first combination of the divided files are made based on the bit streams up to the designated display resolution (S28). Then, the divided files in the first combination are attached to an e-mail, and the e-mail is sent (S30).

If there remain data not yet transmitted (YES at S32), a next combination of the divided files is made (S34), and an e-mail with attachment of the files is sent (S36). Then, the flow returns to step S32. If there remains no data not yet transmitted (NO at S32), the flow is completed.

The above-mentioned processing for prioritizing layer level is similar to that for prioritizing resolution. However, at step S12, a bit stream is made by prioritizing layer. Further, at step S24, it is checked whether display layer level is designated or not. Then, at step S26, the first divided files are made with the bit stream of layer level 0, or at step S28, the first divided files are made with the bit stream up to the designated layer level.

As explained above, an image processing program according to the invention executable by a computer has the steps of:

(a) forming a bit stream of hierarchically encoded JPEG 2000 data for each page of a document image consisting of a plurality of pages by prioritizing the unit of hierarchical encoding such as resolution or layer level;

(b) dividing the bit stream of each of the plurality of pages into a plurality of files based on the unit of hierarchical encoding ;

(c) arranging the plurality of files of all the pages into a plurality of combinations thereof based on the unit of hierarchical encoding; and (d) writing an electronic mail for each of the combinations by attaching files included in the each of the combinations; and (f) sending the electronic mails to the same destination.

Preferably, in the arranging step, each of the plurality of combinations are formed to consist of the files of the same resolution of all the pages, and in the writing step, the electronic mail attached with the files of the lowest unit of hierarchical encoding is written before the files of the other units of hierarchical encoding.

Preferably, the program further has the step of setting a level of the unit of hierarchical encoding on the files to be attached to the electronic mail. Then, one of the plurality of combinations is formed by including files up to the level of the unit of hierarchical encoding, and the electronic mail attached with the files is sent first.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image data processing apparatus which sends data encoded with JPEG 2000, comprising: a hierarchical encoder which forms a bit stream of hierarchically encoded JPEG 2000 data for each page of a document comprising a plurality of pages by prioritizing resolution; an arranger which divides the bit streams of the plurality of pages into a plurality of files based on resolution and arranges the plurality of files of all the pages in a plurality of combinations thereof based on resolution; and a mailer which writes an electronic mail for each of the combinations by attaching all the files included in the each of the combinations and sends the electronic mails to the same destination.

2. The image processing apparatus according to claim 1, wherein said arranger forms the plurality of combinations, each of the combinations consisting of the files of the same resolution of all the pages, and said mailer writes and sends the electronic mail attached with the files of the lowest resolution before the files of the other resolutions.

3. The image processing apparatus according to claim 1, further comprising a setter which sets resolution level on the files to be attached to the electronic mail, wherein said arranger forms one of the plurality of combinations by including files up to the resolution level, and said mailer writes and sends the electronic mail attached with the files up to the resolution level in the one of the plurality of combinations.

4. An image processing apparatus which sends data encoded with JPEG 2000 attached to an electronic mail, comprising: a hierarchical encoder which forms a bit stream of hierarchically encoded JPEG 2000 data for each page of a document comprising a plurality of pages by prioritizing layer; a divider which divides the bit streams of the plurality of pages into a plurality of files based on resolution and arranges the plurality of files of all the pages in a plurality of combinations thereof based on layer level; and a mailer which writes an electronic mail for each of the combinations by attaching all the files included in the each of the combinations and sends the electronic mails to the same destination.

5. The image processing apparatus according to claim 4, wherein said divider forms the plurality of combinations, each of the combinations consisting of the files of the same layer level of all the pages, and said mailer writes and sends the electronic mail attached with the files of the lowest layer level before sending the files of the other layer levels.

6. An image processing method for sending data encoded with JPEG 2000 attached to an electronic mail, comprising the steps of: forming bit streams of hierarchically encoded JPEG 2000 data of a plurality of pages of a document by prioritizing resolution; dividing the bit streams of the plurality of pages into a plurality of files based on resolution; arranging the plurality of files of all the pages in a plurality of combinations thereof based on resolution; writing an electronic mail for each of the combinations by attaching all the files included in the each of the combinations; and sending the electronic mails to the same destination.

7. An image processing method for sending data encoded with JPEG 2000 attached to an electronic mail, comprising: forming bit streams of hierarchically encoded JPEG 2000 data of a plurality of pages of a document by prioritizing layer; dividing the bit streams of the plurality of pages into a plurality of files based on layer level; arranging the plurality of files of all the pages in a plurality of combinations thereof based on layer level; and writes an electronic mail for each of the combinations by attaching all the files included in the each of the combinations; and sending the electronic mails to the same destination.

8. A computer-readable recording medium which records an image processing program comprising the steps of: forming a bit stream of hierarchically encoded JPEG 2000 data for each page of a document image comprising a plurality of pages by prioritizing resolution; dividing the bit stream of each of the plurality of pages into a plurality of files based on resolution; arranging the plurality of files of all the pages in a plurality of combinations thereof based on resolution; and writing an electronic mail for each of the combinations by attaching files included in the each of the combinations; and sending the electronic mails to the same destination.

9. A computer-readable recording medium which records an image processing program comprising the steps of: forming a bit stream of hierarchically encoded JPEG 2000 data for each page of a document image comprising a plurality of pages by prioritizing layer; dividing the bit stream of each of the plurality of pages into a plurality of files based on resolution; arranging the plurality of files of all the pages in a plurality of combinations thereof based on layer level; and writes an electronic mail for each of the combinations by attaching files included in the each of the combinations; and sending the electronic mails to the same destination.

* * * * *